United States Patent Office 3,049,394
Patented Aug. 14, 1962

3,049,394
PROCESS OF DYEING A LINEAR POLYESTER
Leon E. Wolinski, Buffalo, N.Y., assignor to E. I. du Pont de Nemours and Company, Wilmington, Del., a corporation of Delaware
No Drawing. Filed Jan. 5, 1959, Ser. No. 784,886
8 Claims. (Cl. 8—55)

This invention relates to treatment of linear condensation polyesters, concerning especially modification thereof to affect surface characteristics of structures so comprised. More particularly, it concerns treatment of linear terephthalate polyesters, such as poly(ethylene terephthalate), to modify their dyeability and other properties. This application is a continuation-in-part of my copending application Serial No. 537,565, filed September 29, 1955, now abandoned.

A commercially important example of a fiber- and film-forming linear terephthalate polyester, as disclosed by Whinfield and Dickson in Patent 2,465,319, is poly-(ethylene terephthalate), which may be prepared by ester interchange of dimethyl terephthalate with ethylene glycol followed by polymerization at elevated temperatures and reduced pressures. Fibers and films composed of poly(ethylene terephthalate) have achieved wide usage owing to their high tenacity and strength, flexibility, crease resistance, low moisture absorption, and other valuable properties. One of the chief disadvantages associated with poly(ethylene terephthalate) and other linear terephthalate polyesters hitherto has been the difficulty in dyeing or printing fabrics, films, and other articles composed thereof with commercially available dyes, inks, and other coloring materials. Basic dyes, i.e., colored cationic organic substances (such as those containing sulfonium, oxonium or quaternary ammonium functional groups), display relatively little affinity for untreated poly(ethylene terephthalate); furthermore, use of carriers does not remedy this difficulty, the carriers ordinarily affecting the rate of dyeing rather than the equilibrium amount of dye transferred to the polymer. Other linear terephthalate polyesters, such as poly(trans-p-hexahydroxylylene terephthalate), display similar lack of affinity for basic dyes.

Various methods have been proposed for treating articles of poly(ethylene terephthalate) and other linear terephthalate polyesters, particularly fibers and films, to increase the ease of dyeing. Many of these treatments involve strong reagents or require severe conditions so conducive to degradation of the polymer as to yield weak or brittle structures. Frequently the product is so discolored by such treatment that acceptable colors can be obtained only by deep dyeing in the darker shades. A process for improving the color-receptivity of linear terephthalate polyesters without destroying characteristics essential to use of fibers and films made of the polymers would be the more important if the products were substantially colorless or white. Similar considerations have prompted the continuing search for procedures of improving the surface characteristics of articles comprising linear terephthalate polyesters so as to improve their take-up of adhesives, finishes, inks and like materials.

A primary object of the present invention is treatment of linear terephthalate polyesters, especially poly(ethylene terephthalate), to provide improved affinity for basic dyestuffs. Another object is provision of readily colorable articles of linear terephthalate polyesters with unimpaired structure properties. A further object is production of colorless or white linear terephthalate polyester articles of improved surface characteristics. Other objects, together with means and methods for accomplishing the various objects, will be apparent from the following description of the invention.

In general, the objects of this invention are realized by exposing linear terephthalate polyesters to ozone. It comprehends particularly provision of solid articles made up wholly or primarily of linear terephthalate polyesters with surface characteristics modified by treatment with ozone present in the treating atmosphere to a concentration of about 0.1 percent by volume, or higher.

Surprisingly, this treatment yields products that readily accept many dyes and other substances having practically no affinity for the untreated polymer, including substantially all basic dyes. The nature of the structural change effected in the polymer by the ozone is not yet understood although the fact of change is readily ascertained. It is a feature of the present invention that fibers and films so treated remain tenacious and pliable after treatment. Moreover, the process does not introduce color into the product; on the contrary, linear terephthalate polyesters are bleached by ozone, and colorless or white products are obtained.

By "linear terephthalate polyester" is meant a linear condensation polyester comprising recurring glycol dicarboxylate structural units in which at least about 75% of the recurring structural units are units of the formula

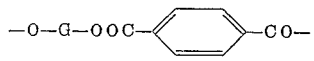

wherein —G— represents a divalent organic radical containing from 2 to about 18 carbon atoms and is attached to the adjacent oxygen atoms by saturated carbon atoms. Polyesters wherein the radical —G— contains from 2 to about 10 carbon atoms are preferred for preparation of advantageous fibers. The terephthalate radical may be the sole dicarboxylate constituent of the recurring structural units, or up to aobut 25% of the recurring structural units may contain other dicarboxylate radicals, such as the adipate, sebacate, isophthalate, bibenzoate, hexahydroterephthalate, diphenoxyethane-4,4'-dicarboxylate, p,p' - carbonyldibenzoate, and p,p' - sulfonyldibenzoate radicals.

Linear terephthalate polyesters having an intrinsic viscosity of at least about 0.35 are preferred for their fiber-forming characteristics.

The intrinsic viscosity of the polymer is used herein as a measure of the degree of polymerization of the polymer and may be defined as:

$$\text{Limit } \frac{\ln \eta_r}{C} \text{ as } C \text{ approaches } 0$$

wherein $\eta_r$ is the viscosity of a dilute solution of the polymer in a solvent divided by the viscosity of the solvent per se measured in the same units at the same temperature; and C is the concentration in grams of the polymer per 100 ml. of solution. Fomal, which comprises 58.8 parts by weight of phenol and 41.2 parts by weight of trichlorophenol, is a convenient solvent for measuring the intrinsic viscosity of linear polyesters, and intrinsic viscosity values reported herein are with reference to Fomal as a solvent.

The linear terephthalate polyesters may be prepared by any one of several well known methods. Various monomers may be prepared by an esterification method by reacting terephthalic acid or a mixture of terephthalic acid and one or more other dicarboxylic acids with a glycol, $G(OH)_2$, where —G— is a radical as defined above, at temperatures in the range of 220–285° C., at superatmospheric pressure, to form the bis-glycol ester or mixture of esters. Polycondensation of these monomers may be carried out at an elevated temperature in the range of 200–320° C. at a pressure reduced to 1 mm. or below with elimination of excess glycol. In place of the acid or acids, ester-forming derivatives may be used, i.e., derivatives which readily undergo polyesterification with a glycol or derivative thereof. For example, the acid chloride or a lower alkyl ester, such as the dimethyl ester, may be used. Similarly, an ester-forming derivative of the glycol may be used in place of the glycol; i.e., a derivative of the glycol which readily undergoes polyesterification with dicarboxylic acids or derivatives thereof. For example, a cyclic oxide from which the corresponding glycol can be derived by hydrolysis may be used.

The glycol, $G(OH)_2$, from which the polyester is prepared, may be any suitable dihydroxy compound containing from 2 to 18 carbon atoms, preferably from 2 to 10 carbon atoms, in which the hydroxyl groups are attached to saturated carbon atoms. Thus, the radical —G— may be of the form —$(C_{n+1}H_{2n+2}Y_{p-1})$—, where $n$ and $p$ are positive integers and $Y$ is a cycloaliphatic group, an aromatic group, an oxy group, or an arylenedioxy group.

Examples of suitable glycols where $p=1$ include the polymethylene glycols, such as ethylene glycol, tetramethylene glycol, hexamethylene glycol, and decamethylene glycol as well as the branched chain glycols such as 2,2-dimethyl-1,3-propanediol and 2,2-dimethyl-1,4-butanediol.

Suitable glycols in which $p=2$ include trans-p-hexahydroxylylene glycol, bis-p-(2-hydroxyethyl)benzene, diethylene glycol, bis-(4-hydroxybutyl) ether, bis-p-($\beta$-hydroxyethoxy)benzene, bis-1,4-($\beta$-hydroxyethoxy)-2,5-dichlorobenzene, bis-4,4'-($\beta$-hydroxyethoxy)diphenyl, 2,6-di($\beta$ - hydroxyethoxy)naphthalene, bis - [p - ($\beta$-hydroxyethoxy)phenyl] ketone, bis-[p-($\beta$-hydroxyethoxy)phenyl] sulfone, and bis-[p-($\beta$-hydroxyethoxy)phenyl] difluoromethane.

Glycols in which $p=3$ include 4,4'-bis-($\beta$-hydroxyethyl)biphenyl, 4,4'-bis-($\beta$-hydroxyethyl)dodecahydrobiphenyl, triethylene glycol, and 2,2'-(ethylenedioxybis-[p-phenyleneoxy])-diethanol. In general, the glycols in which $p$ is greater than 3 are of lesser interest, although certain glycols such as tetraethylene glycol may be used. Mixtures of the glycols may be used. If desired, small amounts, e.g. up to about 15 weight percent, of a higher glycol such as a polyethylene glycol of high molecular weight may be added. Additional glycols which are suitable are disclosed in U.S. Patents 2,831,831, 2,831,832, 2,808,390, 2,807,606, 2,799,666, and 2,762,789.

The conditions of treatment may be varied to yield products exhibiting the desired degree of modification, as measured by improvement in dye receptivity or other desirable characteristics. An ozone-containing gas at substantially atmospheric pressure is usually employed, although gas at reduced pressure or high pressure may be used. At atmospheric pressure, a gas having a concentration of at least about 0.1 percent ozone by volume at room temperature can be employed; preferably, however, an atmosphere having a concentration of at least about 0.5 percent ozone by volume is used. In other words, the concentration by volume of the ozone in the gas is at least equal to that concentration of ozone in a gas at room temperature and atmospheric pressure containing 0.1% ozone by volume. The rate at which surface modification is achieved increases with increasing concentration of ozone and the degree of modification is cumulative up to the point at which a high degree of modification is attained, as evidenced by high affinity of the treated linear terephthalic polyester for basic dyes. Use of commercial ozone generators delivering from five-tenths to three percent of ozone in oxygen or air is most practicable, although higher concentrations of ozone may be used if available. The rate of modification often is greater in the presence of water vapor, and ultraviolet light may be used to catalyze the reaction if desired. Nitrogen and other inert gases may be present in the gaseous mixture without deleterious effect.

Room temperature ordinarily is satisfactory for carrying out the process of the invention. Lower temperatures may be employed to restrict depth or extent of surface modification in structures so treated. However, elevated temperatures permit reduced treating time for comparable results. At temperatures above 230° C., however, the decomposition rate of ozone is appreciably higher and a process of treatment with the gas at a temperature greater than 230° C. is less desirable. One embodiment of the process of the invention, therefore, comprises heating a gas containing at least about 0.1% ozone, preferably about 0.5% ozone, to a temperature less than about 230° C. and contacting the heated gas with a linear terephthalate polyester. Alternately, the linear terephthalate polyester may be heated (as high as 320° C. when the polyester is treated during an extrusion process) and then exposed to a gas containing at least about 0.1% ozone, preferably 0.5% ozone. A shaped structure of the polyester may be heated to any temperature below its melting point, as a practical matter, before treatment. The practice of this invention, as applied to various linear terephthalate polyester structures, is exemplified below.

EXAMPLE I

A commercial ozone generator capable of delivering 0.1 cu. ft. per minute of 2% ozone in oxygen is connected to an inlet at the bottom of an electric oven of 3.0 cu. ft. capacity, the exhaust being located near the top of the oven. The oven is brought to equilibrium condition at 190° C. with a continuous flow of dry ozone gas, whereupon a sample of worsted fabric prepared from poly(ethylene terephthalate) staple yarn is suspended on a rack in the center of the oven for thirty minutes. The treated fabric becomes distinctly whiter than an untreated sample of the fabric, while remaining strong and pliable. A two-gram swatch of the ozonized fabric is immersed for 45 minutes at the boil in 200 ml. of a 0.125% aqueous solution of methylene blue, a basic dye of the sulfonium type, whereupon a medium blue color is imparted to the fabric. A control sample of untreated fabric receives only a very slight blue tint under the same dyeing conditions. Samples of fabric prepared from staple yarn of polyesters derived from terephthalic acid and each of the following glycols: bis-p-(2-hydroxyethyl) benzene, diethylene glycol, bis-p-($\beta$-hydroxyethoxy) benzene, and triethylene glycol are similarly treated and a corresponding medium blue color is achieved upon dyeing under similar conditions with a 0.125% aqueous solution of methylene blue.

A sample of worsted poly(ethylene terephthalate) fabric treated for seven minutes at 190° C. with moist ozone gas supplied from the apparatus of Example I, modified by insertion of a gas-wash bottle filled with distilled water in the line between the ozone generator and the oven, dyes readily with methylene blue to about the same shade of blue as that obtained in Example I.

EXAMPLE II

Samples of worsted poly(ethylene terephthalate) fabric are treated in the ozonization chamber of Example I with moist 2% ozone gas at room temperature (27° C.) for one hour. A 2-gram swatch of the ozonized fabric dyes to a dark blue when immersed in 200 ml. of 0.125% methylene blue solution at the boil for 15 minutes. Another 2-gram sample of the ozonized fabric is dyed deep red by 200 ml. of a 0.125% aqueous solution of a 1,3,3-trimethyl-2-[p-(N - methyl-N-$\beta$-cyanoethylamino)styryl] pseudo indolium salt, a basic dye of the quaternary ammonium type as disclosed by Winter et al. in Patent 2,164,793. Unozonized fabrics are virtually unaffected under the same dyebath conditions. Scouring with aqueous solutions of sodium carbonate or sodium bicarbonate before dyeing does not destroy the affinity of the ozonized fabrics for these basic dyes.

A 0.25 mil film of poly(ethylene terephthalate) treated with 0.125% methylene blue solution under the same conditions employed in Example II acquires a deep blue color. Under the same dyeing conditions a corresponding untreated film acquires only a faint bluish tint. The treated film remains tough and pliable, and no embrittlement of it is observed.

EXAMPLE III

Samples of worsted poly(ethylene terephthalate) fabric are treated in the ozonization chamber with dry 0.5% ozone gas at room temperature (27° C.) for 30 minutes. When treated with methylene blue, a swatch of the fabric is dyed a uniform light blue. In a similar experiment, poly(ethylene terephthalate) fabric treated with dry 0.1% ozone gas at room temperature for 180 minutes is dyed to substantially the same shade of light blue. Unozonized fabrics receive only a faint uneven tint of blue under the same dyeing conditions.

Samples of worsted poly(trans-p-hexahydroxylylene terephthalate) fabric are treated in the ozonization chamber with dry 2% ozone gas a room temperature for one hour. A swatch of the fabric is then treated with 1% (based on fabric weight) of Astrazone Pink FG dye (Colour Index No. 48015) in water at 100° C. for two hours, whereupon it is dyed a medium shade of pink. Under the same dye-bath conditions, an unozonized control sample adsorbs only a faint tint of dye.

EXAMPLE IV

Three 2-gram samples of worsted poly(ethylene terephthalate) fabric are treated in the ozonization chamber with moist 2% ozone gas at 27° C. for ten minutes, twenty-five minutes, and one hour, respectively. Additional samples of fabric are treated with moist 2% ozone at 100° C. and 190° C. for varying lengths of time to establish the time required at these temperatures to produce fabrics dyeable to the light, medium, and dark shades of blue approximately matching the shades obtained with the fabrics ozonized at 27° C. The results of this procedure are given in Table I.

*Table I*

| Color Imparted to Treated Fabric by Methylene Blue | Reaction Time (min.) at Temperature (C.) | | |
|---|---|---|---|
| | 27° | 100° | 190° |
| Light Blue | 10 | 5 | 3 |
| Medium Blue | 25 | 15 | 7 |
| Dark Blue | 60 | 30 | 11 |

A 2-gram sample of worsted poly(ethylene terephthalate) fabric treated in the ozonization chamber with moist 0.1% ozone gas at 190° C. for 50 minutes and then treated with methylene blue dyes to a light shade of blue, substantially the same shade as the sample shown in Table I treated with 2% ozone at 190° C. for 3 minutes.

As indicated in Table I, the degree of dye receptivity in the treated fabric can be controlled readily by varying the time of treatment at any given operating temperature. Although quite deep shades of color are attainable by using the reaction times indicated in the table, slightly deeper shades are attainable with even longer reaction times.

Higher gas temperatures than those shown usually do not lead to substantially lower reaction times. In fact, owing to the well-known thermal instability of ozone, further increases in the temperature of the ozone gas may be undesirable because of accompanying decreased concentration of ozone owing to decomposition thereof into molecular oxygen. The temperature at which the rate of ozonization of linear terephthalate polyesters by hot ozone-containing gas reaches a peak will vary depending on the particular conditions used, including the average hold-up time of the hot ozone-containing gas in the reaction chamber, maximum ozonization rate usually being achieved in the range 180–230° C.; above this range the rate of ozonization falls off rapidly.

Control of polymer color has been a problem in the industrial preparation of poly(ethylene terephthalate), and frequently batches of polymer are produced that are not white enough for certain commercial uses. Ozone acts as an effective bleaching agent for poly(ethylene terephthalate) and other linear terephthalate polyesters as is exemplified below.

EXAMPLE V

Samples of 70-denier, 34-filament, poly(ethylene terephthalate) yarn are treated with moist 2% ozone gas at 27° C. for varying lengths of time. A differential colorimeter is used to compare the treated samples with untreated control samples, the difference in whiteness being measured in N.B.S. (National Bureau of Standards) units (v. Glasser and Troy J. Optical Soc. Am. 42, No. 9, 652–660); the results appear in the following table.

*Table II*

| Treatment time (hours): | Color improvement (N.B.S. units) |
|---|---|
| 1 | 1.0 |
| 2 | 2.0 |
| 4 | 2.4 |
| 8 | 3.1 |

The yarn which is ozonized for eight hours develops a yellowish color when heated to 150° C. for 15 minutes. However, after a pretreatment for one hour in a boiling aqueous solution containing 8% hydrogen peroxide, 25% acetic acid, and 2% sulfuric acid, this yarn retains its white color upon like heating. A sample of yarn treated with moist 2% ozone at 190° C. for twenty minutes is found to be 2.5 N.B.S. units whiter than a control sample of yarn, and heating to 150° C. does not produce any discoloration in this treated yarn.

A hydrogen peroxide treatment can be used to increase the thermal stability of the ozonized fabric with respect to its properties of basic dyeability, although this treatment will not be required in most instances. Boiling for about one hour in an equimolar solution of glacial acetic acid and hydrogen peroxide is recommended to provide this enhanced thermal stability.

EXAMPLE VI

Samples of 0.25 mil poly(ethylene terephthalate) film are treated at 110° C. with 2% ozone gas for thirty minutes. Two one-inch strips of the treated film are coated with a commercially available adhesive comprising a condensation product of dimerized vegetable oil acids with ethylene diamine. These strips are pressed together, rolled, and dried, whereupon it is found that a force of 2714 grams is required to pull the strips apart again. A force of only 1104 grams sufficed to pull apart strips of like unozonized film treated with the same adhesive. In another instance, adjacent strips of ozonized film made of poly(ethylene terephthalate) and carrying a commercially available adhesive made up of a copolymer of butadiene (67%) and acrylonitrile (33%) withstood a pull of 1119 grams before parting, as compared with only 184 grams for like unozonized film treated with the same adhesive.

EXAMPLE VII

Samples of 0.25 mil poly(ethylene terephthalate) film are treated at 110° C. with 2% ozone gas for thirty minutes. Strips of the ozonized film are sealed together with a precision sealing bar ¾" in width at a temperature of 240° C., a pressure of 20 pounds per square inch, and a dwell time of 0.15 second. A force of 320–380 grams per inch is required to pull apart the sealed strips of treated film. Under the same conditions strips of unozonized film could not be sealed together at all (no force required to separate the strips).

It has also been found that linear terephthalate polyesters treated with ozone in accordance with the present invention, especially at temperatures of 125° C. and below, may be further modified by contacting them with an unsaturated organic compound at an elevated temperature. The unsaturated monomers are thereby caused to undergo graft polymerization on the ozonized linear terephthalate polyester, while similarly treated unozonized linear terephthalate polyesters fail to undergo graft polymerization. A variety of useful effects may be achieved in this way, depending upon the vinyl monomer selected. Examples include enhancement of dyeability with dispersed and acid dyes as well as with basic dyes; increasing water repellency; varying fiber properties such as tenacity, elongation, and modulus of elasticity; changing the thermal or electrical conductivity; and improving the soilability characteristics, soil removal, crease recovery, and other factors important in launderability.

EXAMPLE VIII

To improve its water repellency, a swatch of poly(ethylene terephthalate) fabric ozonized with 2% dry ozone in oxygen at room temperature for one hour is dipped in pentamethyldisiloxane methyl methacrylate, placed on an aluminum foil, and inserted in a vacuum oven at 130° for 30 minutes. The sample is then boiled in water, washed in acetone, and dried in an oven. The weight gain is 0.3%. The treated fabric is then subjected to a wettability test in which 5 drops of water are placed upon the fabric spaced 3 cm. apart, the time required for the disappearance of any 3 drops being recorded. After 2 hours, each of the 5 drops on the treated fabric remain in globular form. In the same test, the time required for the disappearance of 3 drops on untreated control fabrics is only 8 seconds. The treated fabric also shows more rapid and more complete recovery from wrinkling than does the untreated fabric.

EXAMPLE IX

A sample of poly(ethylene terephthalate)/5-(sodium sulfo)isophthalate (98/2) twill fabric treated for 1 hour hour with a stream of 2% dry ozone in oxygen is immersed in solution of 40% methyl acrylate in glycol and heated to 140° C. during 15 minutes, after which the sample is removed, scoured in acetone, and dried. The weight gain is 3.3%. The fabric is then treated with 2% (based on fabric weight) of 1,4-diamino-2,3-dichloroanthraquinone in water at 100° C., whereupon it is dyed to a deep shade of violet. A control sample of untreated fabric dyes to only a light shade of violet under the same conditions.

In a similar experiment, swatches of poly(ethylene terephthalate) fabric treated with 2% ozone in oxygen in the same way are heated in solutions of 40% methyl acrylate in glycol. The first sample, heated at 97° C. for 60 minutes, exhibits a weight gain of 3.5%. Another sample, (about 1.5 gms.) heated at 140° C. for 20 minutes, exhibits a weight gain of 6.7% A third sample, heated at 140° C. for 60 minutes, exhibits a weight gain of 8.2%. All of the samples exhibit greatly enhanced dyeability with 1,4-diamino-2,3-dichloroanthraquinone.

In another experiment, a sample of poly(trans-p-hexahydroxylylene terephthalate) staple fiber treated with 2% ozone in oxygen in the same way is heated in a solution of 40% methyl acrylate in glycol at 140° C. for 15 minutes, resulting in a weight gain (after washing and drying) of about 15%. When treated with 1,4-diamino-2,3-dichloroanthraquinone under the conditions described above, the sample is dyed to a deep shade of violet.

EXAMPLE X

In a series of experiments, samples of worsted poly(ethylene terephthalate) fabric are treated at room temperature with dry 0.1% ozone in air for 30, 60 and 180 minutes, respectively. The samples are then placed on wire supports and immersed for 20 minutes in the vapor of methyl methacrylate refluxing at 101° C. After the samples are washed and dried, they exhibit weight gains of 0.7%, 2.1%, and 4.9%, respectively. Unozonized control samples undergo negligible weight gain (less than 0.2%) in refluxing methyl methacrylate under the same conditions.

In another series of experiments, samples of worsted poly(ethylene terephthalate) fabric are treated at room temperature with dry 2% ozone in oxygen for 1, 2, and 3 minutes, respectively. The samples are then placed on wire supports and immersed for 15 minutes in the vapor of methyl methacrylate refluxing at 101° C. After the samples are washed and dried, they exhibit weight gains of 0.2%, 1.1%, and 1.5%, respectively.

When a fast rate of reaction is desired, it is preferred to heat the linear terephthalate polyester itself to the desired temperature and then expose it to a cooling atmosphere containing ozone as the active ingredient. In this way, an elevated reaction temperature is attained while the temperature of the ozone out of contact with the surface of the article remains low enough to minimize decomposition, i.e., from about room temperature to about 200° C. In the manufacture of thin solid structures (e.g., fibers, filaments, and films) this is accomplished conveniently by extruding the linear terephthalate polyester directly into an atmosphere containing ozone or passing it through such an atmosphere soon after the extrusion step.

At the high temperatures employed in spinning or extruding these fibers and films (260° to 320° C.) the ozone affects the polymer almost instantaneously as it solidifies and travels away from the point of extrusion. For example, freshly extruded polymer in film or fiber form may be treated in accordance with this invention by providing a suitable enclosure about the spinning or extruding apparatus and providing for the maintenance of an atmosphere containing ozone. The ozonization process is advantageously performed in such a manner that the extruded articles are uniformly cooled by the ozone-containing gas, using for this purpose cooling chambers such as those disclosed by Heckert in Patent 2,273,105 and by Babcock in Patent 2,252,684. The degree of dye receptivity in the ozonized polymer structure can be controlled by adjusting the extrusion (spinning or casting) speed of the polymer, the temperature of the molten polymer at extrusion, the concentration of the ozone in the cooling gas, and the temperature of the cooling gas.

The modified linear terephthalate polyesters have an increased affinity for many other substances. For example, dyeability with many of the dispersed dyes is improved markedly. Inks, paints, and other coloring materials in many cases are taken up more readily or to greater degree by ozone-treated articles of linear terephthalate polyesters, as are many finishing oils, antistatic agents, adhesives, and other coating compositions. The heat-sealability of films of these polyesters, i.e., the ability of the film to adhere to itself at elevated temperatures, is also enhanced greatly by the ozone treatment. Linear terephthalate polyester fabrics treated with ozone or manufactured from staple fibers so treated have the added desirable characteristic of increased resistance to "pilling," i.e., the tendency towards the accumulation of numerous unsightly small balls of yarn on the surface of a fabric. Other benefits of the practice of the present invention will come readily to mind.

I claim:
1. The process which comprises exposing a linear terephthalate polyester to an atmosphere containing ozone as an active ingredient, for from about 1 minute to about 3 hours at a temperature below about 230° C., the concentration by volume of the ozone in the said atmosphere being at least equal to that concentration of ozone in an atmosphere at room temperature and atmospheric pressure containing 0.1% ozone by volume.

2. The process of claim 1 in which the said polyester is extruded in molten form into a cooling atmosphere containing the said ozone.

3. The process of claim 1 in which the polyester is heated to a temperature between about 180° C. and 230° C.

4. The process of dyeing a linear terephthalate polyester article which comprises first exposing the surface of the said article to an atmosphere containing ozone as an active ingredient, for from about 1 minute to about 3 hours at a temperature below about 230° C., to render the article dye receptive and then applying a dye to the said article, the concentration by volume of the ozone in the said atmosphere being at least equal to that concentration of ozone in an atmosphere at room temperature and atmospheric pressure containing 0.1% ozone by volume.

5. The process which comprises heating to a temperature less than about 230° C. a gas containing ozone in a concentration by volume at least equal to that concentration of ozone in a gas at room temperature and atmospheric pressure containing 0.1% ozone by volume; and contacting a linear terephthalate polyester with the heated gas.

6. The product produced by the process of claim 1.

7. The product of claim 6 wherein the polyester comprises poly(ethylene terephthalate).

8. The product of claim 6 wherein the polyester comprises poly(trans-p-hexahydroxylylene terephthalate).

References Cited in the file of this patent

FOREIGN PATENTS 609,048    Great Britain _____ Oct. 8, 1948